United States Patent

Cassano

[11] Patent Number: 5,346,028
[45] Date of Patent: Sep. 13, 1994

[54] GOLF CART WITH ADJUSTABLE STEERING ASSEMBLY

[76] Inventor: Nicola Cassano, 48 via dei Soncin, Padova, Italy

[21] Appl. No.: 123

[22] Filed: Jan. 4, 1993

[30] Foreign Application Priority Data

Jul. 3, 1992 [IT] Italy .................. PD92A124

[51] Int. Cl.$^5$ ............... B62B 3/04; B62D 1/18
[52] U.S. Cl. ................. 180/19.2; 180/65.1; 180/215; 280/DIG. 5
[58] Field of Search ............ 180/19.1, 19.2, 65.1, 180/215, 908, 19.3; 280/DIG. 5

[56] References Cited

U.S. PATENT DOCUMENTS

| 4,802,547 | 2/1989 | Nakasaki | 280/DIG. 5 |
| 4,848,504 | 7/1989 | Olsen | 180/19.1 |
| 4,874,055 | 10/1989 | Beer | 280/DIG. 5 |
| 4,947,955 | 8/1990 | Hopely, Jr. | 180/65.1 |
| 4,974,693 | 12/1990 | Nakai et al. | 280/DIG. 5 |

FOREIGN PATENT DOCUMENTS 2127364 4/1984 United Kingdom ......... 280/DIG. 5

*Primary Examiner*—Richard M. Camby
*Attorney, Agent, or Firm*—Dowell & Dowell

[57] ABSTRACT

The invention is a golf cart with a motor for the transport of golf equipment and one person. It is equipped with a steering mechanism which enables an individual to drive the cart while sitting on a seat, standing on a board located behind the seat, or walking behind the cart.

8 Claims, 1 Drawing Sheet

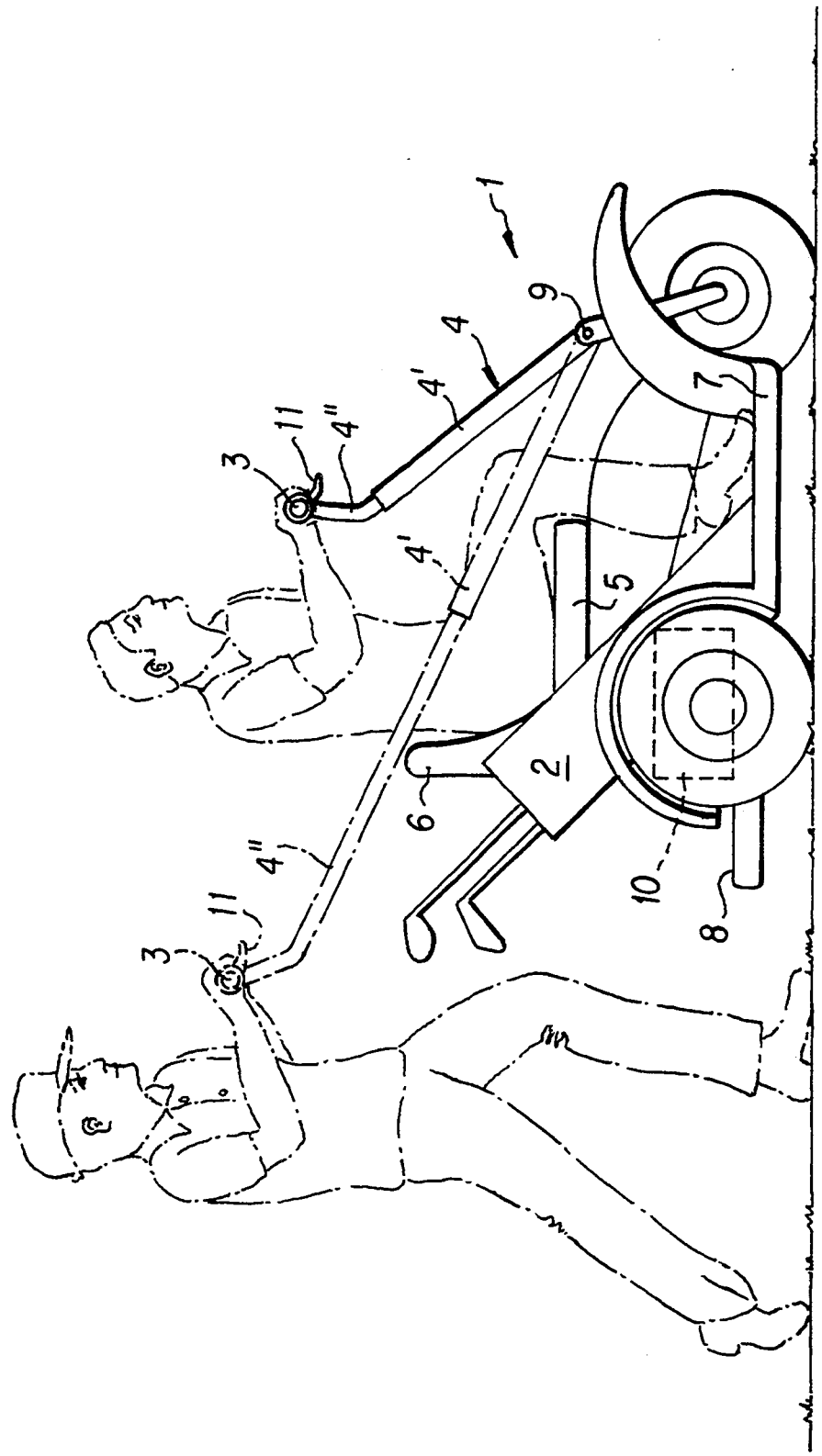

GOLF CART WITH ADJUSTABLE STEERING ASSEMBLY

BACKGROUND OF THE INVENTION

The present invention relates to carts, and, more particularly, to a three-wheeled cart with an electrical motor for the transport of golf equipment and one person. It is equipped with a steering mechanism which allows one to drive the cart sitting on the seat, while standing on the board between the rear wheels, or walking behind the cart itself.

To facilitate the transport of bags containing golf clubs and balls, there ape at present two-wheeled carts with long handles on which the equipment is placed. Such carts must be dragged or pushed manually along the golf course. Some models come equipped with an electrical motor to propel the cart itself.

These carts have the drawbacks that the user must bear part of the weight of the equipment which is placed on the handle, and the user is also forced to walk throughout the golf course.

There are also small, light vehicles for the transport of a few persons (usually one or two) and their equipment. These vehicles completely eliminate the burden of transporting the equipment, but force the user to drive the vehicle throughout the golf course.

SUMMARY OF THE INVENTION

In view of the above considerations, a new type of vehicle has been designed and constructed with a rather small, light-weight electrical motor, which is able to transport both golf equipment and one person. In this vehicle, the individual can drive or guide the cart, either on board the cart itself in a sitting position, or on foot, walking behind the cart.

BRIEF DESCRIPTION OF THE DRAWINGS

The accompanying drawing FIGURE is an illustrational view showing the manner of use of a preferred embodiment of the invention.

DETAILED DESCRIPTION OF THE PREFERRED EMBODIMENT

The cart is made up of a chassis with three wheels, with room for both one person and golf equipment.

An electrical motor which is connected to the two parallel, rear wheels, moves the cart. The the controls for the electrical motor are placed on the grip of the handlebar, allowing for easy control of the cart's movements.

The chassis is constructed so as to support at least one seat and one or two lateral cases or other appropriate housing for the equipment.

The person driving or guiding the above-mentioned cart can choose among three different methods: sit on the seat and rest his feet on the special boards and grip the handle; he can stand up on the rear board; or he can walk behind the cart. The drive/guide members adapt to all three positions and allow the individual to walk when he wishes to or to drive while sitting on the cart when he is tired of walking. The drive/guide members, like the ones for steering and movement, are located on a handlebar supported by a moveable rod which may be bent and/or hinged and/or telescopic, so that the grip can be located in the position which is most convenient for the driver.

In this way, one can combine the useful physical exercise of walking with rest, getting only as much exercise as is required.

The following is an example among many of the practical applications of the present invention as illustrated in the attached figure.

The figure shows a three-wheeled golf cart 1, with housing 2 for golf equipment, a handlebar 3 supported by a rod or steering post 4 and a seat 5 with a back 6.

On either side of the seat 5 there are two boards 7 and another board 8 is located behind the seat 5. The rod or steering post 4 is, in this case, telescopic and includes a first section 4' and an extendible section 4". The first section is hinged at 9 so that the handlebar 3 is in the right position to guide the cart while walking behind the cart (dotted lines), or to drive it while sitting in the cart. An electrical motor 10 is connected to the rear wheels and controls 11 for the motor are mounted to the handlebar. The above are the basic aspects of the invention, on the basis of which these skilled in the art will be able to provide for implementation; therefore, upon implementation certain variants of the present invention may be present, without limiting the scope of the basic innovation.

I claim:

1. A golf cart comprising:
   a front wheel;
   rear wheels;
   a body;
   a seat mounted above said body;
   front boards located substantially on opposite sides of said seat and a rear board located substantially behind said seat; and
   means for steering the golf cart comprising a steering post including a first section having a first end hingedly connected to said front wheel and a second end, a second section telescopically mounted from said second end of said first section, a handlebar attached to said second section, said second section being extendible such that said handlebar is moveable between a first position at which said handlebar is located above said body and a second position at which said handlebar is positioned rearwardly of said body, and wherein the cart is capable of being steered by an operator seated on said seat, standing on said rear board, or walking behind said body.

2. The golf cart of claim 1, further comprising means for containing golf equipment.

3. The golf cart of claim 2, further comprising a motor connected to said rear wheels.

4. The golf cart of claim 3, further comprising means for controlling said motor connected to said handlebar.

5. A golf cart comprising:
   a front wheel;
   rear wheels;
   a body;
   a seat mounted on said body;
   front boards mounted on said body substantially on opposite sides of said seat and a rear board mounted on said body substantially behind said seat; and
   means for steering the golf cart including an extendible steering post having a handlebar attached to an outer end thereof and being hingedly connected to said front wheel at an inner end thereof, said steering post being extendible such that said handlebar is positionable from a first position at which said handlebar is adjacent to said seat to a second position at which said handlebar is disposed rearwardly of said body, and wherein the cart is capable of being steered by an operator seated on said seat, standing on said rear board, or walking behind said body of the cart.

6. The golf cart of claim 5, further comprising a motor connected to said rear wheels.

7. The golf cart of claim 6, further comprising means for controlling said motor connected to said handlebar.

8. The golf cart of claim 7, further comprising means for containing golf equipment.

* * * * *